(12) United States Patent
Moser et al.

(10) Patent No.: US 8,020,782 B2
(45) Date of Patent: Sep. 20, 2011

(54) TRANSMISSION THERMOSTAT DEVICE

(75) Inventors: George Moser, Mason, MI (US); Adam Ostapowicz, Westland, MI (US)

(73) Assignee: EDC Automotive, LLC, Auburn Hills, MI (US)

( * ) Notice: Subject to any disclaimer, the term of this patent is extended or adjusted under 35 U.S.C. 154(b) by 691 days.

(21) Appl. No.: 11/992,003

(22) PCT Filed: Sep. 20, 2006

(86) PCT No.: PCT/US2006/036669
§ 371 (c)(1),
(2), (4) Date: Mar. 13, 2008

(87) PCT Pub. No.: WO2007/035819
PCT Pub. Date: Mar. 29, 2007

(65) Prior Publication Data
US 2009/0114183 A1 May 7, 2009

Related U.S. Application Data

(60) Provisional application No. 60/718,706, filed on Sep. 20, 2005.

(51) Int. Cl.
*F01P 7/02* (2006.01)
*F01P 7/14* (2006.01)

(52) U.S. Cl. ............ 236/101 E; 236/101 C; 236/101 R; 123/41.08; 123/41.09

(58) Field of Classification Search ............... 236/101 R, 236/101 C, 93 R, 34, 34.5, 101 E; 123/41.08, 123/41.09, 41.1, 41.13, 196 AB; 62/196.4; 137/468
See application file for complete search history.

(56) References Cited

U.S. PATENT DOCUMENTS

| 1,888,225 | A | * | 11/1932 | Hetherington | 236/93 R |
| 3,554,440 | A | * | 1/1971 | Austin et al. | 236/34.5 |
| 4,828,169 | A | * | 5/1989 | Smith | 236/66 |
| 6,253,837 | B1 | * | 7/2001 | Seiler et al. | 165/103 |

FOREIGN PATENT DOCUMENTS

EP 1544524 A1 * 6/2005

OTHER PUBLICATIONS

International Search Report and Written Opinion of the ISA/US for PCT/US2006/036669, mailed May 8, 2007.

* cited by examiner

*Primary Examiner* — Chen-Wen Jiang
(74) *Attorney, Agent, or Firm* — Harness, Dickey & Pierce, P.L.C.

(57) ABSTRACT

A transmission thermostat device includes a body having first and second input ports and first and second output ports. A first fluid path extends between the first input port and the first output port. A second fluid path extends between the second input port and the second output port. A bypass port is disposed between the first fluid path and the second fluid path. A temperature sensing mechanism is disposed within the housing. The temperature sensing mechanism element is operative in a first mode to close the bypass port and in a second mode to open the bypass port. The temperature sensing mechanism includes a bimetal element responsive to a change in temperature.

16 Claims, 8 Drawing Sheets

TRANSMISSION THERMOSTAT DEVICE

CROSS-REFERENCE TO RELATED APPLICATIONS

This application is a 371 National Stage of International Application No. PCT/US2006/036669, filed Sep. 20, 2006, and published in English as WO 2007/035819 A2 on Mar. 29, 2007. This application claims priority to U.S. Provisional Application Ser. No. 60/718,706 filed Sep. 20, 2005 and entitled Transmission Thermostat. The disclosures of U.S. Provisional Application Ser. No. 60/718,706 and PCT/US2006/036669 are hereby incorporated herein by reference as if fully set forth herein.

INTRODUCTION

A transmission of a motor vehicle requires cooling. Such cooling is conventionally achieved by pumping automatic transmission fluid (ATF) through a transmission oil cooler. Pumping of the ATF through the transmission oil cooler when its temperature is already sufficiently low and does not require further cooling can negatively affect performance. In this regard, the oil may become too viscous for the efficient operation of the transmission.

Efforts have been heretofore made to use a wax element for selectively controlling the flow of ATF. While such an approach may have proven to be acceptable for certain applications, wax elements have been associated with reliability issues. Due to the high temperature and the high pressure under which an oil thermostat generally operates, flow control with a wax element is susceptible to failure. In this regard, wax-type thermostats are susceptible to failure because of the tendency of the wax to leak out of the wax capsule.

Continuing concern with the failure rate of conventional transmission thermostats under the high temperature and pressure conditions of modern vehicles encourages development to improve reliability. The present teachings provide such a transmission thermostat with improved reliability.

SUMMARY

The present teachings provide a transmission thermostat including a body having first and second input ports and first and second output ports. A first fluid path extends between the first input port and the first output port. A second fluid path extends between the second input port and the second output port. A bypass port is disposed between the first fluid path and the second fluid path. A temperature sensing mechanism is disposed within the housing. The temperature sensing element is operative in a first mode to close the bypass port and in a second mode to open the bypass port. The temperature sensing mechanism includes a bimetal element responsive to a change in temperature.

The present teachings also provide a thermostat device for selectively cooling fluid of a vehicle transmission. The thermostat device includes a housing with a first input port to receive fluid from the vehicle transmission, a first output port leading to a fluid cooling device, a second input port for fluid coming back from the fluid cooling device and a second output port leading the fluid back to the transmission. A first fluid path in the housing extends between the first input port and the first output port. A second fluid path extends between the second input port and the second output port. At least one bypass port extends between the first and second fluid paths. One or more bimetal elements open and close the at least one bypass port.

The present teachings further provide a cooling arrangement for selectively and automatically cooling a vehicle transmission. The cooling arrangement includes a cooling device and a thermostat device. A fluid loop normally routes fluid between the transmission and the cooling device. The fluid loop includes first and second portions passing through the thermostat device. At least one bypass port in the thermostat device extends between the first and second portions of the fluid path. At least one temperature responsive bypass mechanism is disposed in the thermostat device. The at least one temperature responsive bypass element includes a bimetal element and is operative in a first mode to close the at least one bypass port and in a second mode to open the at least one bypass port.

Further areas of applicability of the present invention will become apparent from the description provided hereinafter. It should be understood that the description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF VARIOUS ASPECTS

The following description is merely exemplary in nature and is in no way intended to limit the invention, its application, or uses.

Figure 1:
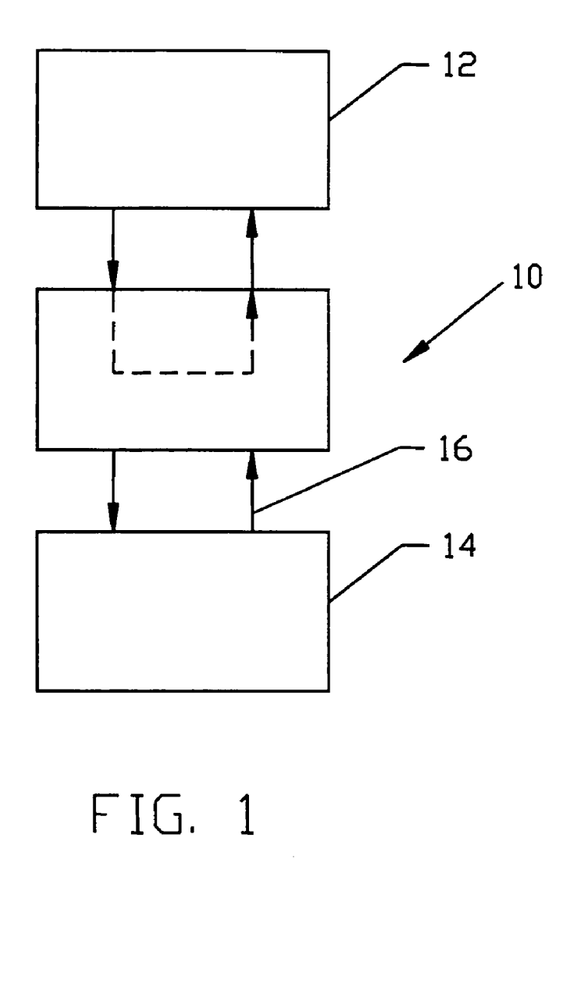
FIG. 1 is a diagram schematically illustrating a transmission thermostat according to the present teachings, the transmission thermostat device shown operatively associated with a transmission and a cooling device of a motor vehicle.
Figure 2:
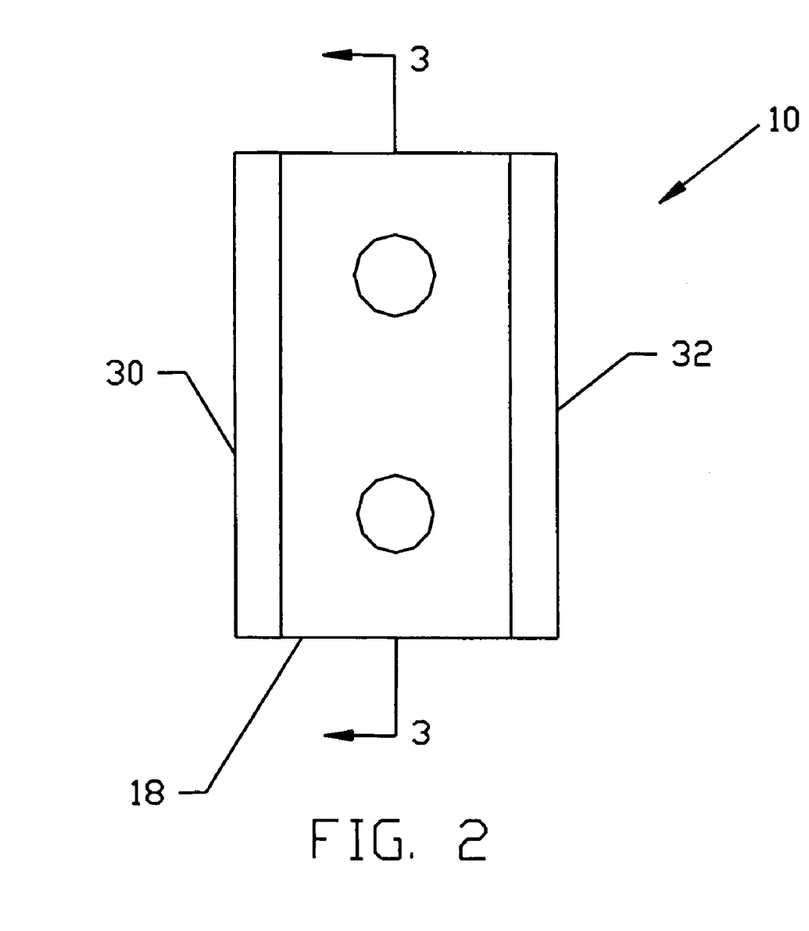
FIG. 2 is an end view of a transmission thermostat device according to the present teachings.

Referring to FIGS. 1 through 4, a transmission thermostat device in accordance with the present teachings is illustrated and generally identified at reference character 10. As schematically shown in FIG. 1, the transmission thermostat device 10 may be operatively positioned between a transmission 12 and a cooling device such as an oil cooler 14 of a motor vehicle 16. Insofar as the present teachings are concerned, it will be understood that the transmission 12 and the cooling device 14 are conventional in both construction and operation. A fluid loop 16 normally routes transmission fluid between the transmission 12 and the cooling device 14 for cooling the transmission fluid. The transmission thermostat device 10 is operable in a normal mode (shown in FIG. 1 in solid lines and FIG. 2) for circulating transmission fluid between the transmission 12 and the cooling device 14. The transmission thermostat 10 is also operable in a bypass mode (shown in FIG. 1 in hidden lines and in FIG. 3) for bypassing the oil cooler 14 and returning fluid directly to the transmission 12.

Figure 3:
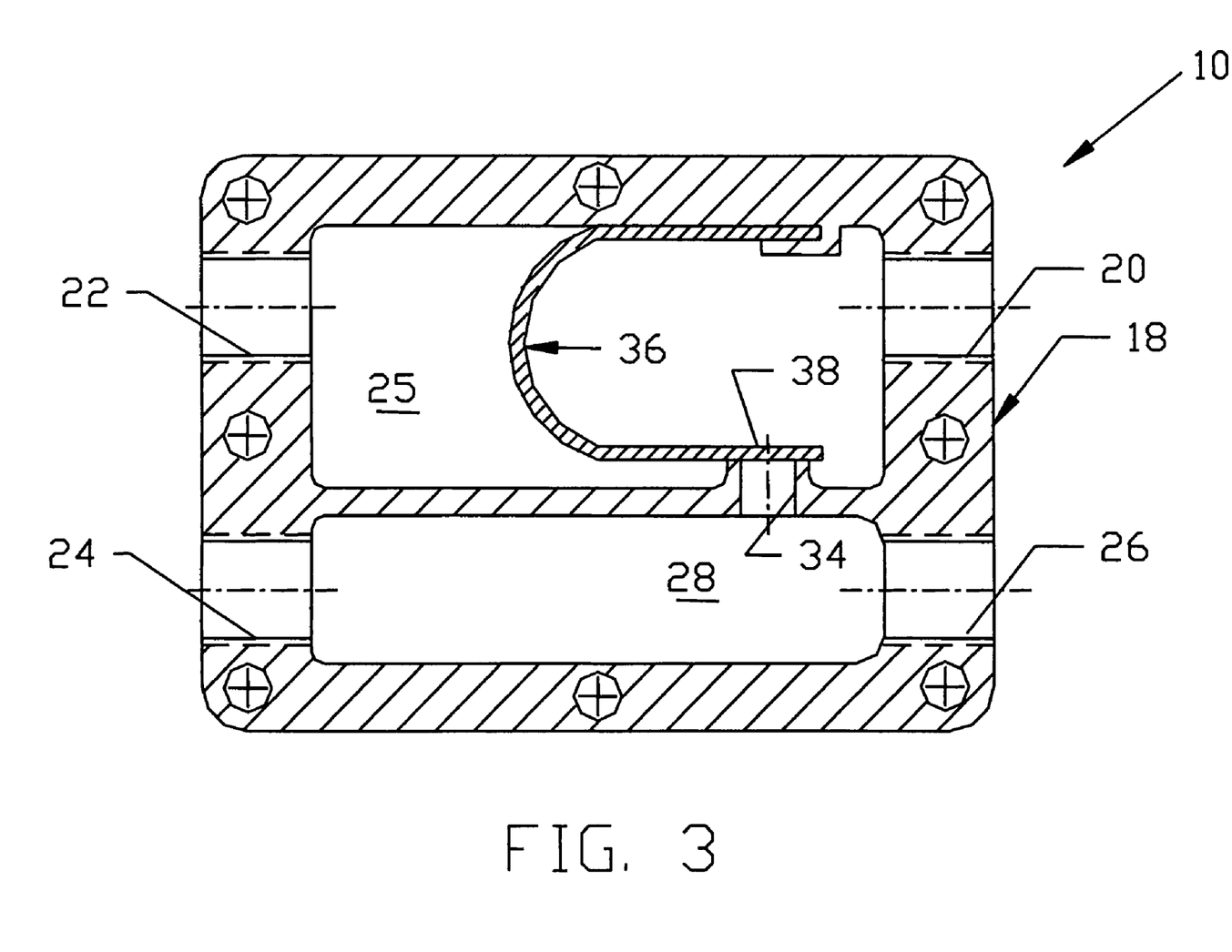
FIG. 3 is a cross-sectional view taken along the line 3-3 of FIG. 2, the thermostat device shown in a first mode or normal operative mode for circulating fluid between the transmission and the cooling device.
Figure 4:
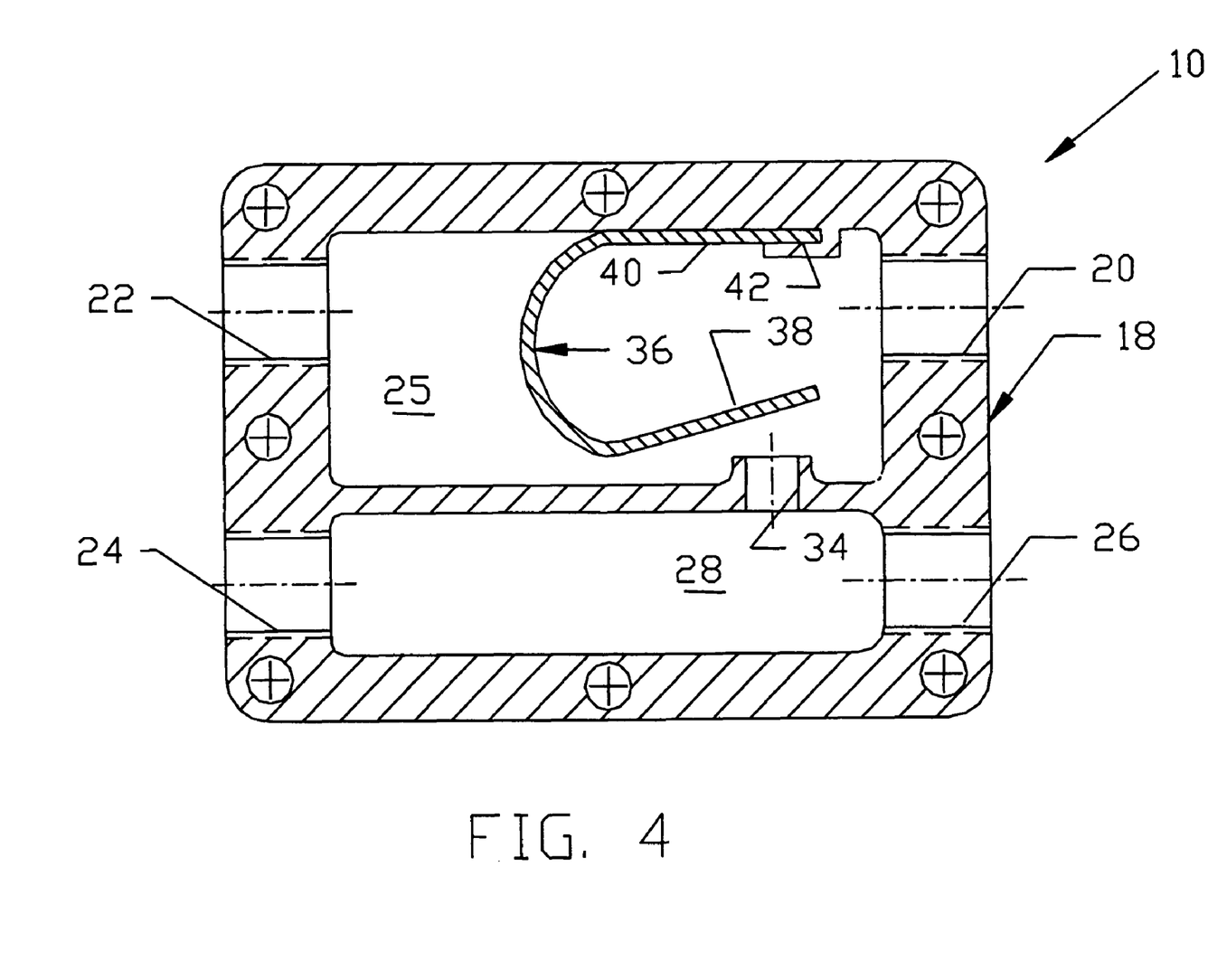
FIG. 4 is another cross-sectional view taken along the line 3-3 of FIG. 2, the transmission thermostat device shown in a second or bypass mode for bypassing the cooling device and returning fluid directly to the transmission.

The thermostat device 10 may generally include a body or housing 18. The housing 18 may generally include a first input port 20 for receiving transmission fluid from the transmission and a first output port 22 for directing the transmission fluid to the cooling device 14. A first fluid path or a first portion of the fluid loop 16 may extend between the first input port 20 and the first output port 22. The first portion of the fluid loop 16 may pass through a cavity 25. The housing 18 may further include a second input port 24 for receiving fluid from the cooling device 14 and a second output port 26 for routing fluid back to the transmission 12. A second fluid path or second portion of the fluid loop 16 may extend between the second input port 24 and the second output port 26. The second portion of the fluid loop 16 may intersect a second cavity 28 defined by the housing 18.

The thermostat device 10 may further include a pair of side plates 30 and 32. The side plates 30 and 32 may be secured to the body 18 with fasteners or in any other manner well known in the art.

The body 18 of the thermostat device 10 may further define a bypass port 34. The bypass port 34 may extend between the cavities 25 and 28 and thereby the first and second fluid paths of the thermostat device 10 as will become more apparent below, the bypass port 34 allows the thermostat 10 to selectively operate to bypass the cooling device 14 and return the fluid directly to the transmission 12.

A temperature sensing mechanism 36 may be disposed within the housing 18. More particularly, the temperature sensing mechanism 36 may be disposed within the cavity 25. The temperature sensing mechanism 36 may comprise a bimetal element which functions to open the bypass port 34 when the fluid temperature is below a predetermined value. The bimetal element 36 may be generally U-shaped. A first leg 38 of the bimetal element 36 may seat against the bypass port 34 and thereby close the bypass port 34 under normal operating conditions when the fluid temperature is above the predetermined temperature. When the fluid temperature is below the predetermined temperature, the bimetal element 36 may change shape (as shown in FIG. 4) to thereby open the bypass port 34 and allow fluid to route directly back to the transmission 12.

A second leg 40 of the bimetal element 36 may be secured to the housing 18. For example, the second leg 40 may be received within a slot 42 defined by the housing 18. In addition, or alternatively, the second leg may be welded or otherwise secured to the body 18. When the vehicle is operating under normal conditions and it is desirable to provide cooling the transmission fluid by the cooling device 14, the bimetal element 36 operates in a first mode (as shown in FIG. 3) to close the bypass port 34. When the fluid temperature is below the predetermined value, such as at vehicle startup, the bimetal element 34 operates in a second mode (as shown in FIG. 4), and allows fluid to pass through the port 34. In this regard, the transmission fluid will flow along the path of least resistance. As the cooling device 14 is highly restrictive, the fluid is substantially directed from the first cavity 25 to the second cavity 28 and from there back to the transmission 12 through the port 26. If the temperature again rises, the bimetal element 36 will gradually close the bypass port 34, thereby reactivating the cooling device 14. Because of the consistency of bimetal elements, a highly reliably and repeatable mechanism is achieved.

Figure 5:
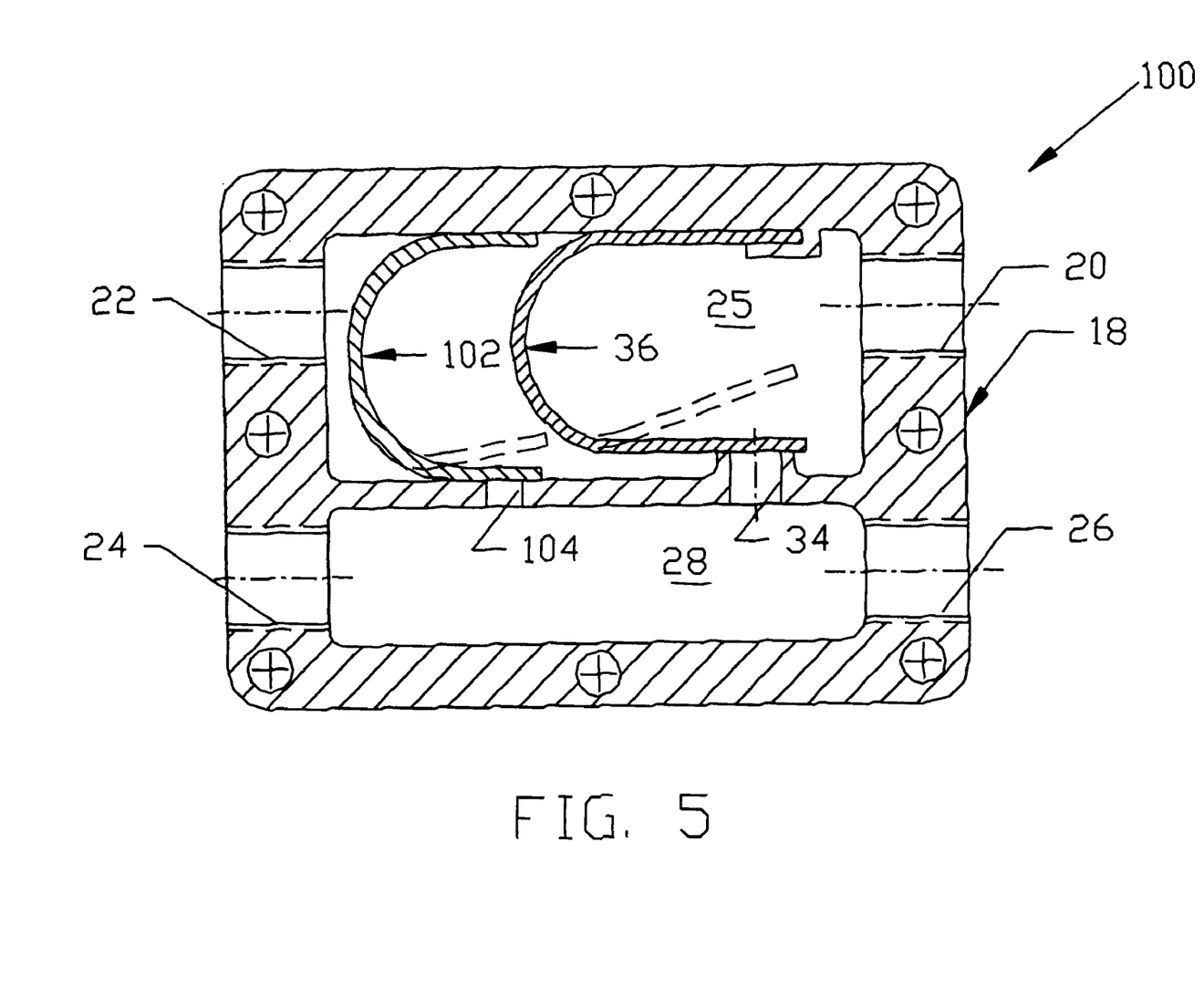
FIG. 5 is a cross-sectional view similar to FIG. 3, illustrating another transmission thermostat device in accordance with the present teachings.

In the cross-sectional view of FIG. 5, another thermostat device in accordance with the present teachings is illustrated and generally identified at reference character 100. It will be understood that the cross-section of FIG. 5 is substantially identical to the cross-section of FIGS. 3 and 4 and that the thermostat device 100 may be substituted in the schematic diagram of FIG. 1 for the thermostat device 10. In view of the similarities between the thermostat devices 10 and 100, like reference numerals have been used in the drawings to identify substantially similar features.

In addition to the bimetal element 36 and its bypass port 34, the thermostat device 100 may include a second bimetal element 102 and a secondary bypass port 104. The second bimetal element 102 may be designed to have a different characteristic than the first bimetal element 36. For example, the second bimetal element 102 may have a different size and/or material or other characteristic. Such an arrangement may provide a more precise tuning of the thermostat device 100. For example, the second bimetal element 102 may be made more rugged and less flexible, thereby providing a smaller stroke but also higher forces than may be needed in high pressure situations. By contrast the first bimetal element 36 may be designed to provide more flexibility and therefore higher strokes and higher flows, without a need for high forces to overcome high pressures, because the second bimetal will overcome the pressures and provide pressure relief. The role of first and second bimetal elements 36 and 102 may be reversed, of course. It is also possible to use more than two bimetal elements.

Figure 6:
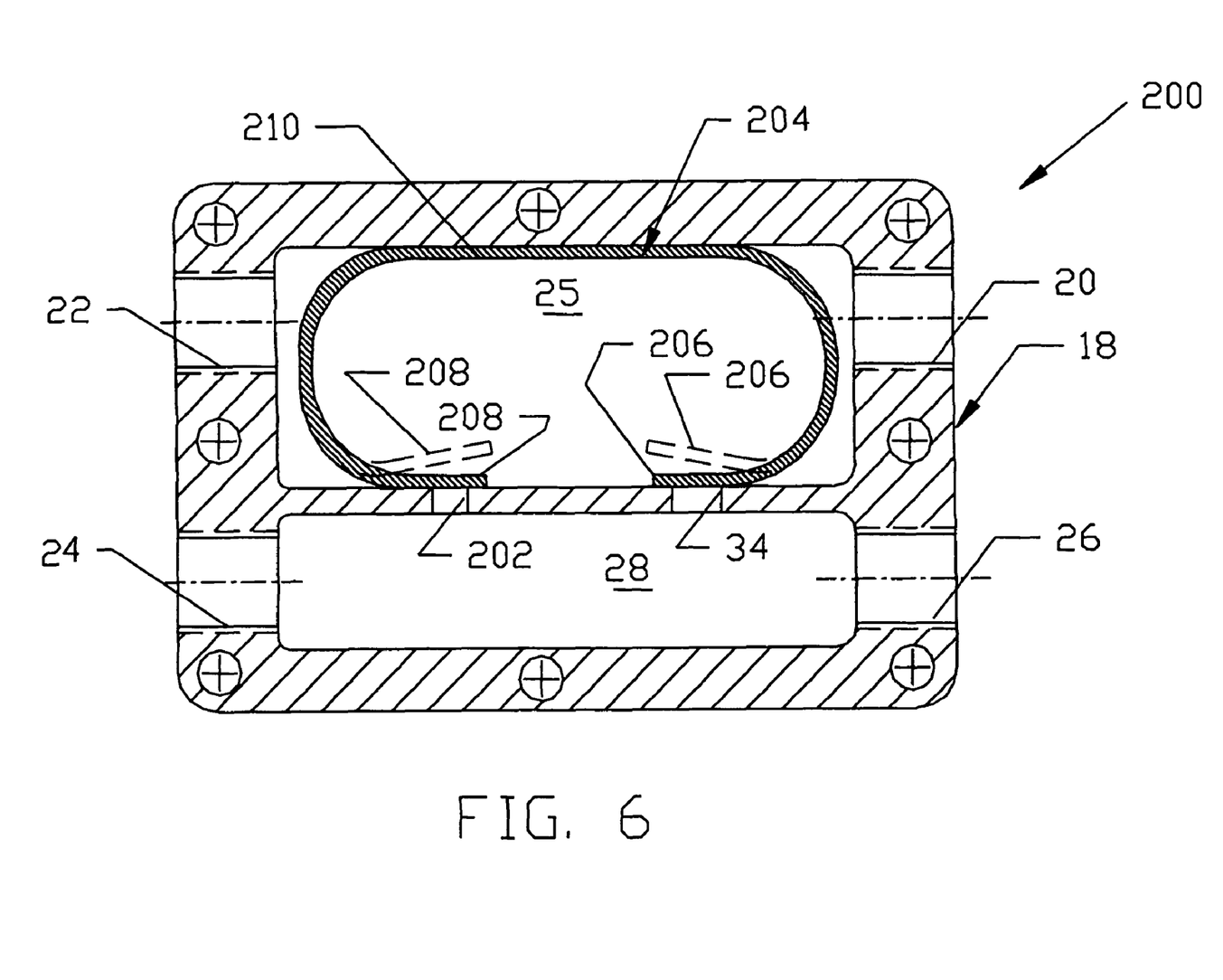
FIG. 6 is a cross-sectional view similar to FIG. 3, illustrating another transmission thermostat device in accordance with the present teachings.

In the cross-sectional view of FIG. 6, another thermostat device in accordance with the present teachings is illustrated and generally identified at reference character 200. It will be understood that the cross-section of FIG. 6 is again substantially identical to the cross-section of FIGS. 3 and 4 and that the thermostat device 200 may be substituted in the schematic diagram of FIG. 1 for the thermostat device 10. In view of the similarities between the thermostat devices 10 and 200, like reference numerals will continue to be used in the drawings to identify substantially similar features.

The thermostat device 200 may include the first bypass port 24 and a second bypass port 202 rather than having two discrete bimetal elements as with the thermostat device 100, the thermostat device 200 may include a single bimetal element 204 for selectively opening both of the first and second bypass ports 34 and 202. In this regard, a first end 206 may be associated with the first bypass port 34 and a second end 208 may be associated with the second bypass port 202. An intermediate portion 210 of the bimetal element 204 may be welded or otherwise secured to the housing 18. Under normal operating conditions in which cooling of the fluid is required, the bimetal element closes the bypass ports 34 and 202, as shown in solid lines in FIG. 6. The temperature of the fluid drops, the bimetal element contracts and the ends 206 and 208 are displaced to the positions shown in hidden lines in FIG. 6 to open bypass ports 34 and 202. As discussed above with respect to the thermostat device 100, the two ends 208 may have different shape, size or material characteristics as so to achieve different operating characteristics.

Figure 7:
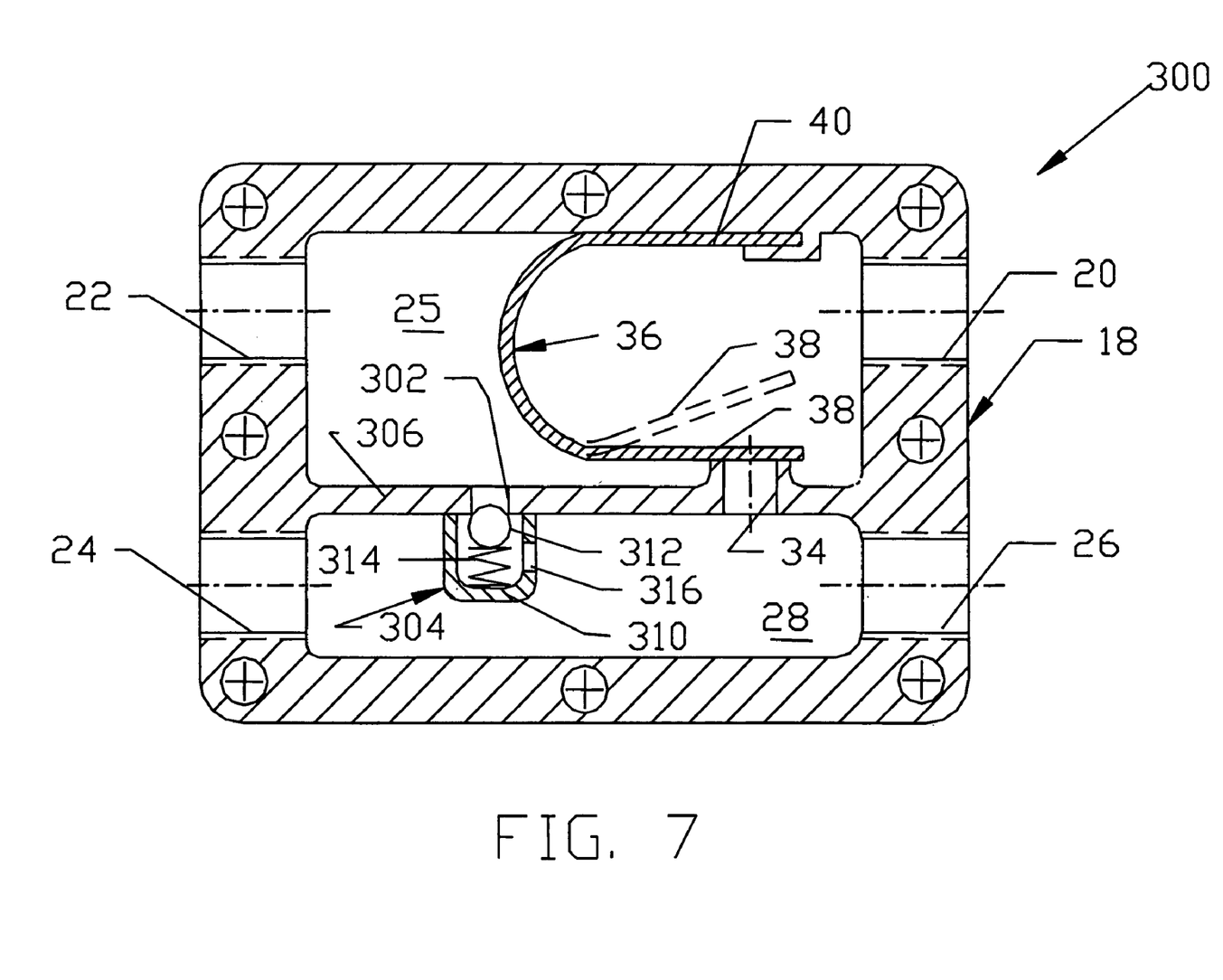
FIG. 7 is a cross-sectional view similar to FIG. 3, illustrating another transmission thermostat device in accordance with the present teachings.

In the cross-sectional view of FIG. 7, another thermostat device in accordance with the present teachings is illustrated and generally identified at reference character 300. It will be understood that the cross-section of FIG. 7 is again substantially identical to the cross-section of FIGS. 3 and 4 and that the thermostat device 300 may be substituted in the schematic diagram of FIG. 1 for the thermostat device 10. In view of the similarities between the thermostat devices 10 and 300, like reference numerals will continue to be used in the drawings to identify substantially similar features.

The thermostat device 300 may include a second bypass port 302. The second bypass port 302 may be associated with a pressure relief mechanism 304. The pressure relief mechanism 304 may be disposed within the cavity 28 and secured to a wall 306 dividing the chambers 25 and 28. The pressure relief mechanism 304 may function to protect the cooling device 14 from excessive pressure at low temperatures when high oil viscosity may raise the fluid pressure to dangerously high levels. The pressure relief mechanism 304 may further function to relieve pressure inside the chamber 25, thereby making it easier for the bimetal element 36 to lift off from its closed or seated position (as shown in solid lines) on the bypass port 34 in high pressure situations. This easier lift-off allows the use of a thinner or narrower bimetal element 36, thereby resulting in a cost savings.

The pressure relief mechanism 304 may include a housing 310 and a ball 312. The ball 312 is normally biased to close the bypass port 302 by a spring member 314. When fluid pressure in the cavity 25 overcomes the force of the spring 314, the ball 312 is downwardly displaced and fluid is permitted to pass through the bypass port 302 into the housing 310 and through an outlet 316 in the housing.

Figure 8:
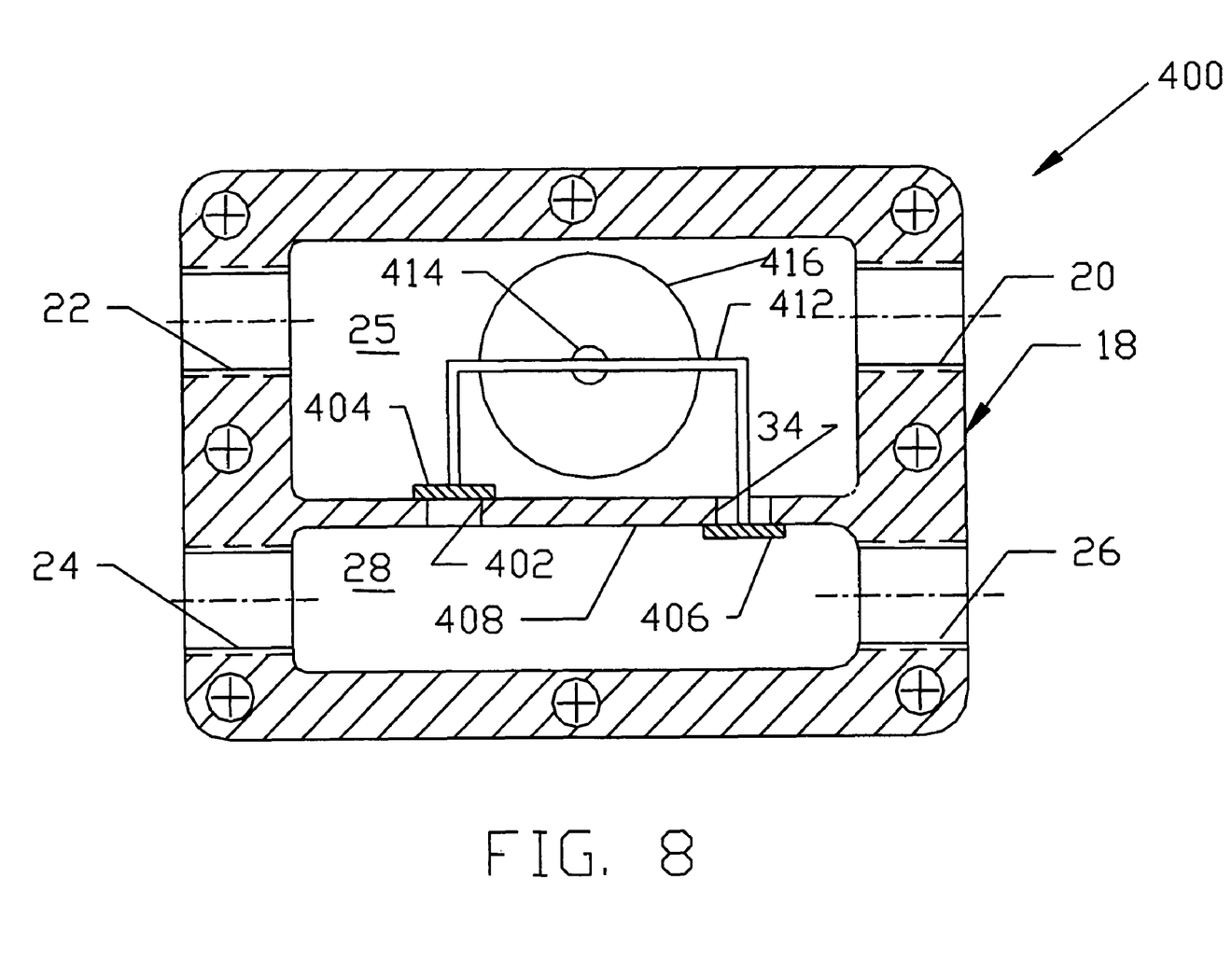
FIG. 8 is a cross-sectional view similar to FIG. 3, illustrating another transmission thermostat device in accordance with the present teachings.

In the cross-sectional view of FIG. 8, another thermostat device in accordance with the present teachings is illustrated and generally identified at reference character 400. It will be understood that the cross-section of FIG. 8 is again substantially identical to the cross-section of FIGS. 3 and 4 and that the thermostat device 400 may be substituted in the schematic diagram of FIG. 1 for the thermostat device 10. In view of the similarities between the thermostat devices 10 and 400, like reference numerals will continue to be used in the drawings to identify substantially similar features.

The thermostat device 400 may include first and second bypass ports 34 and 402 extending between chambers 25 and 28. The bypass ports 34 and 402 may be controlled by valves 404 and 406 located on opposite sides of a bypass panel 408. The high pressure in the chamber 25 may act in opposite ways on both valves 404 and 406, trying to close valve 404 and trying to open valve 406. Both valves 404 and 406 may be joined by a rod or frame structure 412, with a resulting net zero force on the structure 412. The structure 412 may be pivoted on a rotating shaft 414. Since there is zero net torque on the shaft 414, it is easy to turn it by the action of a temperature sensitive bimetal coil 416. This is a balanced mechanism that allows the use of relatively small and inexpensive bimetal coils 416 even in very high pressure situations.

Figure 9:
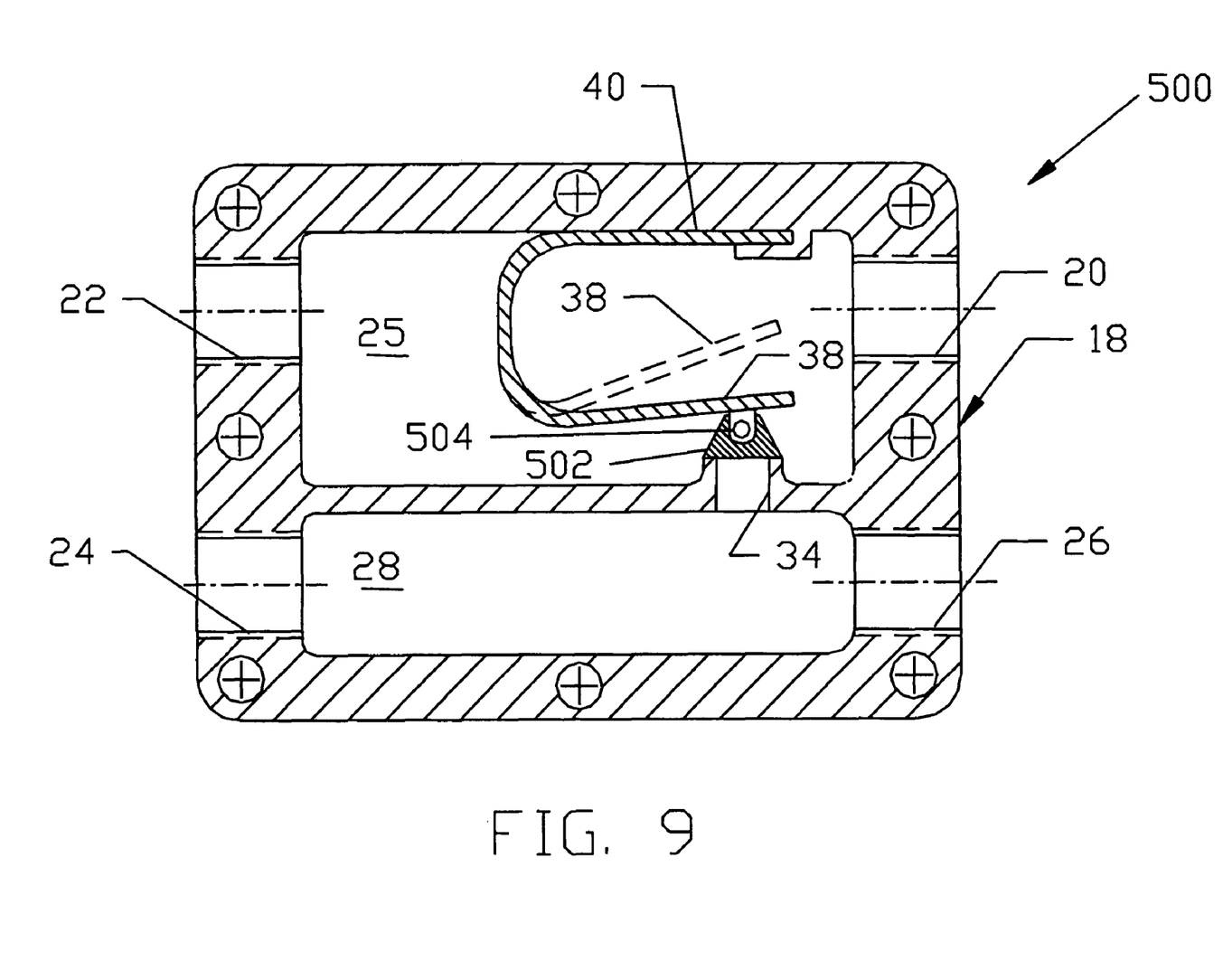
FIG. 9 is a cross-sectional view similar to FIG. 3, illustrating another transmission thermostat device in accordance with the present teachings.

In the cross-sectional view of FIG. 9, another thermostat device in accordance with the present teachings is illustrated and generally identified at reference character 500. It will be understood that the cross-section of FIG. 9 is again substantially identical to the cross-section of FIGS. 3 and 4 and that the thermostat device 500 may be substituted in the schematic diagram of FIG. 1 for the thermostat device 10. In view of the similarities between the thermostat devices 10 and 500, like reference numerals will continue to be used in the drawings to identify substantially similar features.

The thermostat device 500 may incorporate a valve body or element 502. The valve element 502 may be carried by the bimetal element 36. Explaining further, the valve element 502 may be pivotally carried by the second end 38 at a bracket 504. The valve element 502 is normally seated on the bypass port 34 and thereby closes the bypass port 34. When the bimetal element 36 contracts (as shown by hidden lines in FIG. 10), the second end 38 of the bimetal element 36 raises and thereby lifts the valve element 502 from its seated condition relative to the bypass port 34. The pivotal connection of the valve element 502 relative to the bimetal element 36 may function to absorb an angle difference and thereby provide improved sealing with the bypass port 34. A tight seal of the bypass port 34 is necessary when the temperature of the fluid is high and may otherwise be difficult to achieve with a bimetal element 36 that is rotating and changing its shape both longitudinally and laterally.

The foregoing discussion discloses and describes merely exemplary arrangements of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A transmission thermostat device comprising:
a body including first and second input ports and first and second output ports;
a first fluid path extending between the first input port and the first output port;
a second fluid path extending between the second input port and the second output port; at least one bypass port disposed between the first fluid path and the second fluid path;
at least one temperature sensing mechanism disposed within the housing, the at least one temperature sensing mechanism operative in a first mode to dose the at least one bypass port and in a second mode to open the at least one bypass port, the at least one temperature sensing mechanism including a bimetal element responsive to a change in temperature; and
wherein the at least one temperature sensitive mechanism includes first and second bimetal elements, the first and second bimetal elements having distinct opening and closing characteristics that can be combined to tune the behavior of the thermostat device.

2. The transmission thermostat of claim 1, wherein the bimetal element doses the bypass port at a predetermined temperature.

3. The transmission thermostat device of claim 2, wherein the valve element is pivotally carried by the bimetal element.

4. The transmission thermostat of dam 1, wherein the bimetal is U-shaped.

5. The transmission thermostat device of dam 1, wherein the bimetal is shaped like a straight beam.

6. The transmission thermostat device of dam 1, wherein the bimetal includes a pair of U-shaped portions.

7. The transmission thermostat device of claim 1, wherein the at least one temperature sending mechanism includes first and second bimetal elements, the first and second bimetal elements having substantially identical shape, thickness and material.

8. The transmission thermostat device of claim 1, further comprising an internal pressure relief mechanism disposed in the housing for limiting pressure to a predetermined level.

9. The transmission thermostat of claim 8, wherein the pressure relief mechanism includes a spring loaded ball for normally closing a bypass port.

10. The transmission thermostat device of claim 1 wherein the bimetal element is coil shaped.

11. The transmission thermostat device of claim 1, further comprising a valve element carried by the bimetal element for opening and closing the bypass port.

12. A thermostat device for selectively cooling fluid of a vehicle transmission, the thermostat device comprising:

a housing with a first input port to receive fluid from the vehicle transmission, a first output port leading to a fluid cooling device, a second input port for fluid coming back from the fluid cooling device and a second output port leading the fluid back to the transmission; a first fluid path in the housing between the first input port and the first output port;

a second fluid path between the second input port and the second output port;

at least one bypass port extending between the first and second fluid paths;

at least one bimetal element for opening and closing the at least one bypass port; and;

wherein the at least one bypass port includes first and second bypass ports and the thermostat device further includes first and second valves controlled a balanced way such that a fluid pressure opens the first valve while at the same time closes the second valve so as to result in a zero net force situation.

13. A cooling arrangement for selectively and automatically cooling fluid of a vehicle transmission, the cooling arrangement comprising:

a cooling device;

a thermostat device;

a fluid loop for normally routing fluid between the transmission and the cooling device, the fluid loop including first and second portions passing through the thermostat device;

at least one bypass port in the thermostat device, the at least one bypass port extending between the first and second portions of the fluid path;

at least one temperature responsive bypass mechanism in the thermostat device, the at least one temperature responsive bypass element including a bimetal element and operative in a first mode to close the at least one bypass port and in a second mode to open the at least one bypass port; and a pressure relief mechanism for relieving pressure in the first portion of the fluid loop, the pressure relief mechanism including a pressure sensitive member normally closing a pressure relief port and opening the pressure relief port upon a predetermined pressure in the first portion of the fluid path.

14. The cooling arrangement for selectively and automatically cooling fluid of a vehicle transmission of claim 13, wherein a fluid resistance of the at least one bypass port is lower than a fluid resistance of the cooling device.

15. The cooling arrangement for selectively and automatically cooling fluid of a vehicle transmission of claim 13, wherein the bimetal element automatically changes from the first mode to the second mode at a predetermined temperature.

16. The cooling arrangement for selectively and automatically cooling fluid of a vehicle transmission of claim 13, wherein the pressure relief mechanism includes a ball normally biased into seating engagement with a pressure relief port.

* * * * *